(12) United States Patent
Iida et al.

(10) Patent No.: US 9,898,764 B2
(45) Date of Patent: *Feb. 20, 2018

(54) INFORMATION PROCESSING DEVICE, VIDEO PLAYBACK METHOD, PROGRAM, AND VIDEO PLAYBACK SYSTEM

(71) Applicant: Sony Corporation, Tokyo (JP)

(72) Inventors: Akinori Iida, Kanagawa (JP); Yukihisa Miya, Tokyo (JP); Hidehiko Kakinuma, Tokyo (JP); Kazumasa Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,635

(22) Filed: Oct. 3, 2013

(65) Prior Publication Data

US 2014/0040049 A1 Feb. 6, 2014

Related U.S. Application Data

(63) Continuation of application No. 12/132,815, filed on Jun. 4, 2008, now Pat. No. 8,589,972.

(30) Foreign Application Priority Data

Jun. 6, 2007 (JP) .................................. 2007-150928

(51) Int. Cl.
*H04N 7/10* (2006.01)
*G06Q 30/02* (2012.01)
*H04L 29/06* (2006.01)

(52) U.S. Cl.
CPC ..... *G06Q 30/0277* (2013.01); *H04L 65/4015* (2013.01); *H04L 65/604* (2013.01)

(58) Field of Classification Search
CPC ......................... H04N 21/812; H04N 21/4331
(Continued)

(56) References Cited

U.S. PATENT DOCUMENTS 5,815,671 A * 9/1998 Morrison ............. H04H 20/106
348/E7.024
7,266,832 B2 9/2007 Miller
(Continued)

FOREIGN PATENT DOCUMENTS

JP 11-259930 9/1999
JP 2001-111921 4/2001
(Continued)

*Primary Examiner* — Jivka Rabovianski
(74) *Attorney, Agent, or Firm* — Wolf, Greenfield & Sacks, P.C.

(57) ABSTRACT

A video playback system includes a video distribution server and at least one information processing device. The video distribution server includes a video distribution portion that performs streaming distribution of a video stream, an alternative video distribution portion that distributes an alternative video, and a control information distribution portion that distributes control information. The information processing device includes a receiving portion that receives the video stream, the alternative video, and the control information, a storage portion that stores the alternative video and the control information, a video stream playback portion that performs streaming playback of the video stream, an alternative video playback portion that plays back the stored alternative video, and a playback switching control portion that, based on the stored control information, controls switching between the streaming playback and the playback of the alternative video.

14 Claims, 14 Drawing Sheets

| CONTENT DATA ID | C1 | C2 | C3 | ・・・ | N |
|---|---|---|---|---|---|
| PLAYBACK TIME | 00:10:03.000 | 00:00:03.000 | 00:00:15.000 | | 00:0:15.000 |
| CONTENT TYPE | MAIN PROGRAM CONTENT | CM | CM | | CM |
| SWITCHABILITY FLAG | NO | YES | NO | | YES |

(58) Field of Classification Search
USPC .............. 725/32, 34, 35, 42, 10, 63, 36, 105
See application file for complete search history.

(56) References Cited

U.S. PATENT DOCUMENTS

| | | |
|---|---|---|
| 7,412,714 B2* | 8/2008 | Kitayama ........................ 725/34 |
| 2001/0042249 A1* | 11/2001 | Knepper et al. ................. 725/42 |
| 2002/0184047 A1 | 12/2002 | Plotnick et al. |
| 2002/0194595 A1 | 12/2002 | Miller et al. |
| 2003/0043789 A1* | 3/2003 | Okajima .............. H04H 20/106 370/360 |
| 2003/0149975 A1* | 8/2003 | Eldering et al. ................. 725/34 |
| 2003/0188308 A1* | 10/2003 | Kizuka .................. H04H 60/46 725/32 |
| 2004/0158852 A1* | 8/2004 | Wysocki .......................... 725/32 |
| 2005/0210502 A1* | 9/2005 | Flickinger et al. ............. 725/34 |
| 2006/0287912 A1 | 12/2006 | Raghuvamshi |
| 2007/0220575 A1* | 9/2007 | Cooper ................ H04N 7/1675 725/118 |
| 2008/0307483 A1 | 12/2008 | Iida et al. |
| 2009/0158318 A1 | 6/2009 | Levy |

FOREIGN PATENT DOCUMENTS

| | | |
|---|---|---|
| JP | 2001-357300 | 12/2001 |
| JP | 2002-271736 | 9/2002 |
| JP | 2002-290889 | 10/2002 |
| JP | 2003-61053 | 2/2003 |
| JP | 2003-188838 | 7/2003 |
| JP | 2003-244677 | 8/2003 |

* cited by examiner

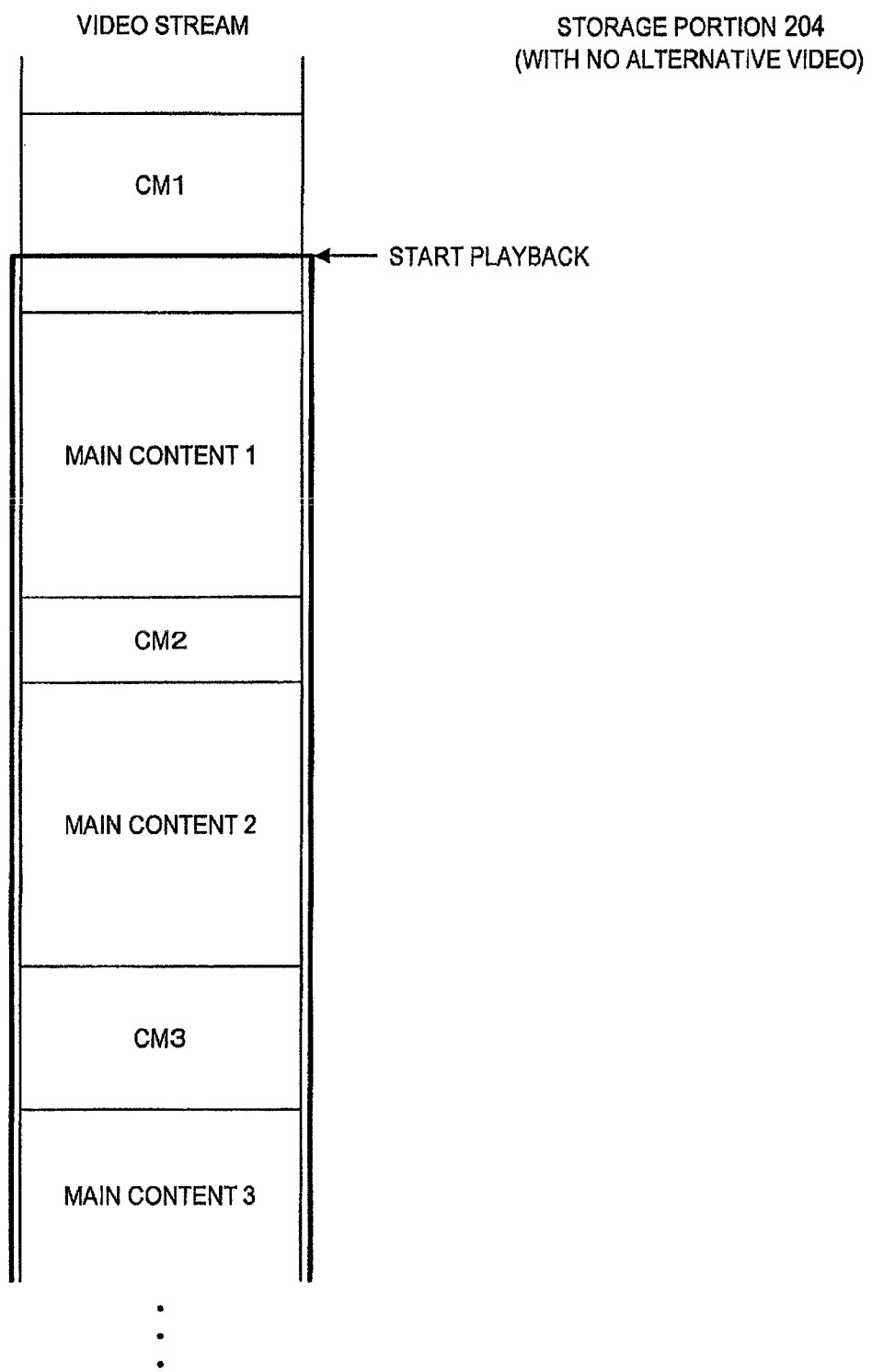

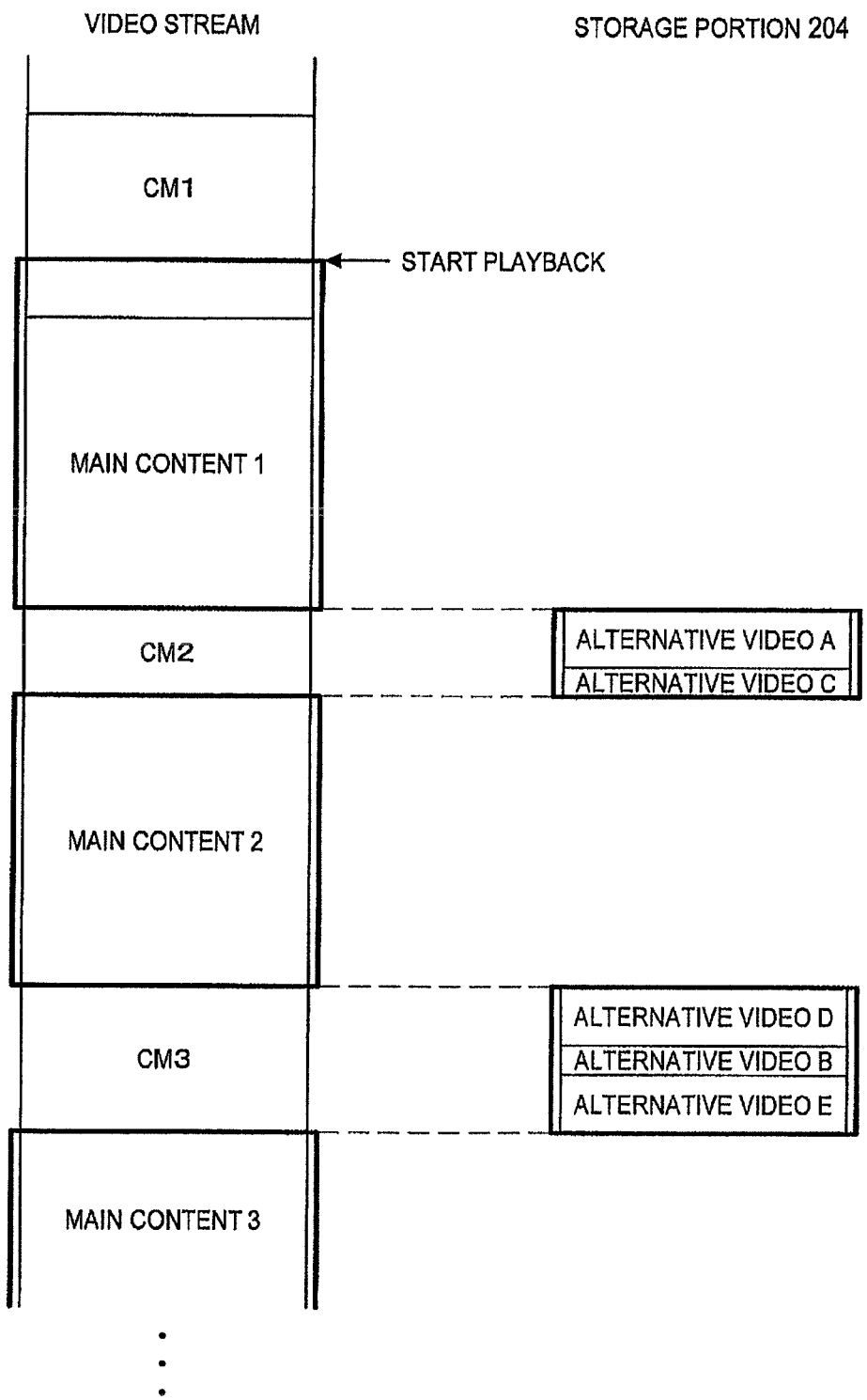

FIG.4A

| CONTENT DATA ID | C1 | C2 | C3 | ... | N |
|---|---|---|---|---|---|
| PLAYBACK TIME | 00:10:03.000 | 00:00:03.000 | 00:00:15.000 | | 00:0:15.000 |
| CONTENT TYPE | MAIN PROGRAM CONTENT | CM | CM | | CM |
| SWITCHABILITY FLAG | NO | YES | NO | | YES |

FIG.4B

```
NUMBER OF ALTERNATIVE CM ELEMENTS = N
< ALTERNATIVE CM ELEMENT (1) >
     CONTENT DATA ID
          NUMBER OF ALTERNATIVE ATTRIBUTE ELEMENTS = NN
          < ALTERNATIVE ATTRIBUTE ELEMENT (1) >
               ATTRIBUTE TYPE = p1
               ATTRIBUTE TYPE VALUE = v1
          < /ALTERNATIVE ATTRIBUTE ELEMENT (1) >
            .
            .
          < ALTERNATIVE ATTRIBUTE ELEMENT (NN) >
               ATTRIBUTE TYPE = p1
               ATTRIBUTE TYPE VALUE = v1
          < /ALTERNATIVE ATTRIBUTE ELEMENT (NN) >
     UPPER LIMIT PLAYBACK TIMES 10
     PERIOD OF USE 070501 - 170531
PLAYBACK PRIORITY 1
< /ALTERNATIVE CM ELEMENT (1) >
   .
   .
< ALTERNATIVE CM ELEMENT (N) >
< /ALTERNATIVE CM ELEMENT (N) >
```

FIG.5

```
USER ID abc 12xyz
NUMBER OF ALTERNATIVE ATTRIBUTE ELEMENTS = NN
< ALTERNATIVE ATTRIBUTE ELEMENT (1) >
        ATTRIBUTE TYPE = p1
        ATTRIBUTE TYPE VALUE = v1
< /ALTERNATIVE ATTRIBUTE ELEMENT (1) >
    .
    .
< ALTERNATIVE ATTRIBUTE ELEMENT (NN) >
< /ALTERNATIVE ATTRIBUTE ELEMENT (NN) >
```

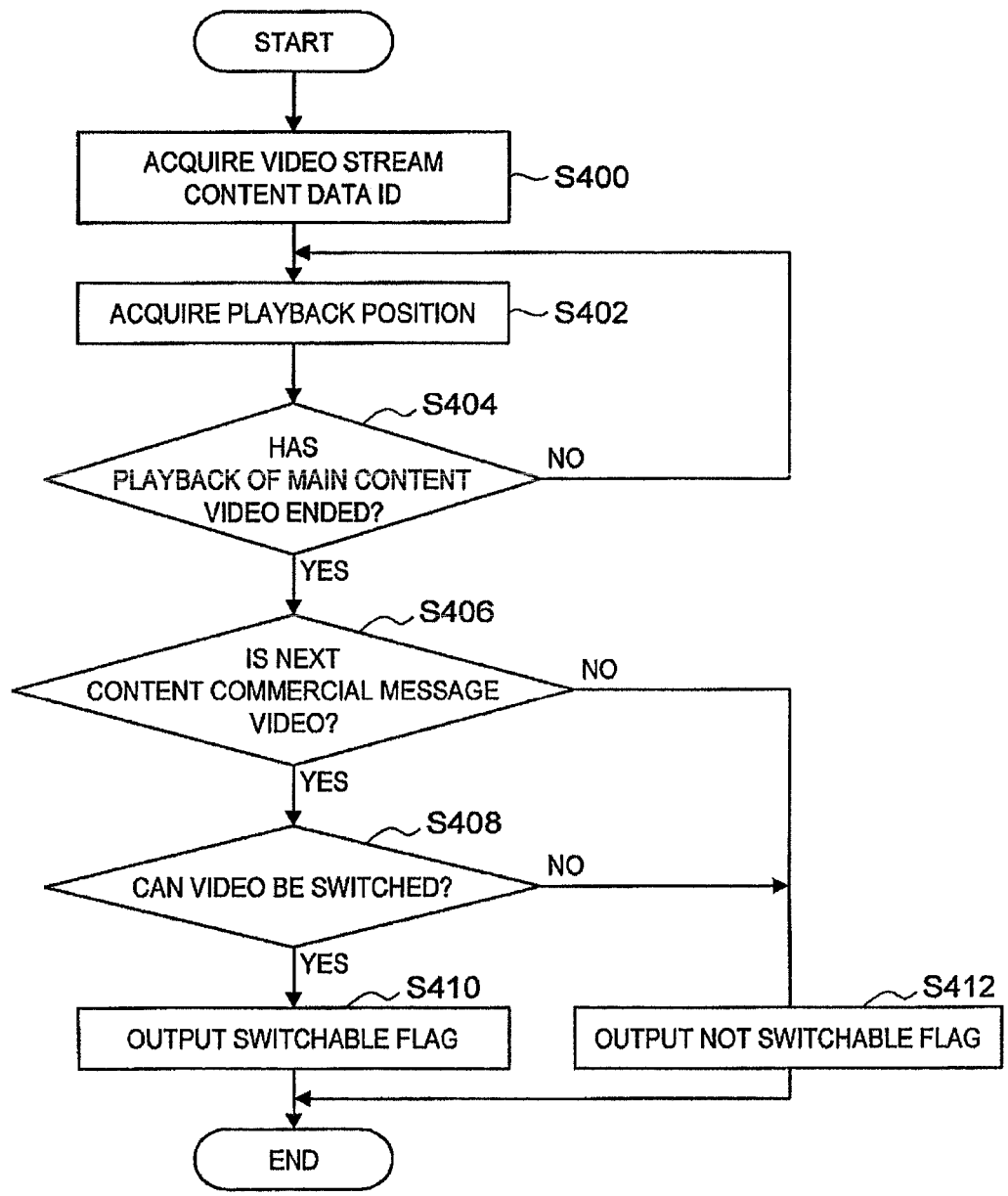

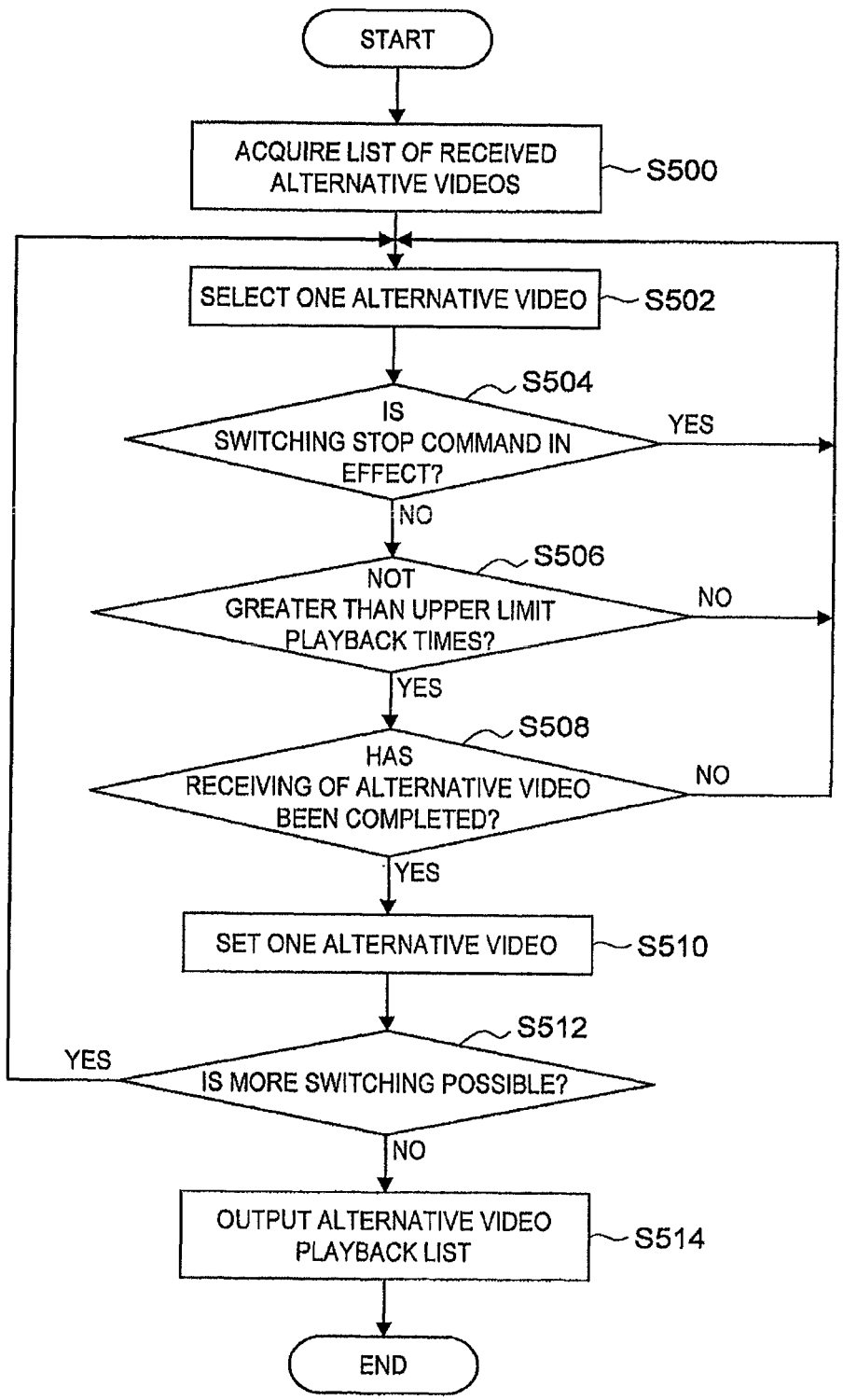

INFORMATION PROCESSING DEVICE, VIDEO PLAYBACK METHOD, PROGRAM, AND VIDEO PLAYBACK SYSTEM

CROSS REFERENCES TO RELATED APPLICATIONS

This application is a continuation of and claims the benefit under 35 U.S.C. § 120 of U.S. patent application Ser. No. 12/132,815, titled "INFORMATION PROCESSING DEVICE, VIDEO PLAYBACK METHOD, PROGRAM, AND VIDEO PLAYBACK SYSTEM," filed on Jun. 4, 2008, which claims the benefit under 35 U.S.C. § 119 of Japanese Patent Application JP 2007-150928, filed on Jun. 6, 2007. The entire contents of these applications are hereby incorporated by reference in their entireties.

BACKGROUND OF THE INVENTION

Field of the Invention

The present invention relates to an information processing device, a video playback method, a program, and a video playback system.

Description of the Related Art

In recent years, the spread of Internet access has allowed a streaming distribution service to be provided that utilizes the Internet protocol to distribute video, audio, and the like, for example. This sort of streaming distribution service distributes a video stream in which content and a commercial message are combined.

A technology has been developed for this sort of service that provides a commercial message that is matched to a user of an information processing device that plays back the video. In Japanese Patent Application Publication No. JP-A-2001-357300, for example, a technology is disclosed that dynamically modifies and distributes the commercial message in a provider device that performs the streaming distribution. Furthermore, in Japanese Patent Application Publication No. JP-A-2002-290889, for example, a technology is disclosed in which a playback device stores video that is distributed from a provider device, then combines and plays back content and a commercial message that are included in the video that the playback device has stored.

SUMMARY OF THE INVENTION

However, the known technology that provides the commercial message that is matched to the user who uses the information processing device must go through an editing process that inserts the commercial message that is matched to the user in one of the device on the distribution side and the device on the playback side (the information processing device that the user uses). In addition, in a case where the editing process that inserts the commercial message that is matched to the user is performed in the device on the playback side (the information processing device that the user uses), the known technology that provides the commercial message that is matched to the user who uses the information processing device can play back only video that is stored in the device on the playback side, so it cannot also play back a video stream that is distributed.

Moreover, with the known technology that provides the commercial message that is matched to the user who uses the information processing device, the video that is played back on the information processing device that the user uses becomes a fixed video that is edited in one of the device on the distribution side and the device on the playback side. (Here, video is just one example, and the same applies to audio.) Therefore, with the known technology that provides the commercial message that is matched to the user who uses the information processing device, only the fixed commercial message can be provided after the editing, so it is not possible to provide the commercial message in a flexible manner.

Furthermore, with the known technology that provides the commercial message that is matched to the user who uses the information processing device, the information processing device can play back only the fixed video that was edited as described above. Therefore, for example, in a case where the edited, fixed video is stored in the information processing device and the stored video is played back, the information processing device can always play back only the edited, fixed video.

The present invention addresses the problems described above and provides an information processing device, a video playback method, a program, and a video playback system that are new and improved and that make it possible on a single information processing device to switch between playback of a distributed video stream and playback of an alternative video that is separate from the video stream.

According to an embodiment of the present invention, there is provided an information processing device that includes a receiving portion, a storage portion, a video stream playback portion, an alternative video playback portion, and a playback switching control portion. The receiving portion receives a video stream, an alternative video, and control information that are distributed from a video distribution server. The video stream includes a main content video and a commercial message video. The control information is used for controlling switching between the video stream and the alternative video. The storage portion stores the alternative video and the control information that the receiving portion receives. The video stream playback portion performs streaming playback of the video stream that the receiving portion receives. The alternative video playback portion plays back the alternative video that is stored in the storage portion. The playback switching control portion, based on the control information that is stored in the storage portion, controls switching between the streaming playback in the video stream playback portion and the playback of the alternative video in the alternative video playback portion.

The information processing device can include the receiving portion, the storage portion, the video stream playback portion, the alternative video playback portion, and the playback switching control portion. The receiving portion can receive the video stream, the alternative video, and the control information that are distributed from the video distribution server. The storage portion can store the alternative video and the control information that the receiving portion receives. The video stream playback portion can perform the streaming playback of the video stream that the receiving portion receives. The alternative video playback portion can play back the alternative video that is stored in the storage portion. The playback switching control portion, based on the control information that is stored in the storage portion, can control the switching between the streaming playback in the video stream playback portion and the playback of the alternative video in the alternative video playback portion. This configuration makes it possible to switch between the playback of the distributed video stream and the playback of the alternative video that is separate from the video stream.

The playback switching control portion, based on the control information, may also cause both the streaming playback in the video stream playback portion and the playback of the alternative video in the alternative video playback portion to be performed.

This configuration makes it possible to perform the video playback in a more flexible manner.

The information processing may also include an alternative video acquisition portion that, based on the control information that is stored in the storage portion, acquires the alternative video that is distributed from the video distribution server.

This configuration makes it possible to actively acquire the alternative video.

The storage portion may also store user information for selectively acquiring the alternative video from the video distribution server, and the alternative video acquisition portion may selectively acquire the alternative video based on the user information.

This configuration makes it possible to acquire the alternative video selectively.

The information processing device may also include a control information acquisition portion that acquires the control information that is distributed from the video distribution server.

This configuration makes it possible to actively acquire the control information. Note that it is also possible for the information processing device to acquire the control information by a method (passive acquisition of the control information) in which the video distribution server provides to the information processing device control information that is individually created for the user according to a separately defined attribute in the video distribution server.

The alternative video acquisition portion may also store log information in the storage portion when the alternative video acquisition portion plays back the alternative video. The information processing device may also include a log transmission portion that transmits the log information to the video distribution server.

This configuration makes it possible to transmit to the video distribution server a log that pertains to the playback of the alternative video.

According to the embodiments of the present invention described above, there is also provided a video playback method. The video playback method includes a step of receiving a video stream, an alternative video, and control information that are distributed from a video distribution server. The video stream includes a main content video and a commercial message video. The control information is used for controlling switching between the video stream and the alternative video. The video playback method also includes a step of storing the alternative video and the control information that are received in the receiving step. The video playback method also includes a step of performing streaming playback of the video stream that is received in the receiving step. The video playback method also includes a step of determining, based on the control information that is stored in the storing step, whether the streaming playback in the streaming playback step will be replaced by playback of the alternative video. The video playback method also includes a step of switching from the video stream that is being played back to the alternative video that is stored and playing back the alternative video, based on a result of the determination in the determining step.

Using this method makes it possible to switch between the playback of the distributed video stream and the playback of the alternative video that is separate from the video stream.

According to the embodiments of the present invention described above, there is provided a computer program that includes programming instructions to control a computer to perform a step of receiving a video stream, an alternative video, and control information that are distributed from a video distribution server. The video stream includes a main content video and a commercial message video. The control information is used for controlling switching between the video stream and the alternative video. The instructions also control the computer to perform a step of storing the alternative video and the control information that are received in the receiving step. The instructions also control the computer to perform a step of performing streaming playback of the video stream that is received in the receiving step. The instructions also control the computer to perform a step of determining, based on the control information that is stored in the storing step, whether the streaming playback in the streaming playback step will be replaced by playback of the alternative video. The instructions also control the computer to perform a step of switching from the video stream that is being played back to the alternative video that is stored and playing back the alternative video, based on a result of the determination in the determining step.

This program makes it possible to switch between the playback of the distributed video stream and the playback of the alternative video that is separate from the video stream.

According to the embodiments of the present invention described above, there is provided a video playback system that includes a video distribution server and at least one information processing device that is capable of playing back a video that is distributed from the video distribution server. The video distribution server includes a video distribution portion, an alternative video distribution portion, and a control information distribution portion. The video distribution portion performs streaming distribution of a video stream that includes a main content video and a commercial message video. The alternative video distribution portion performs file distribution of an alternative video. The control information distribution portion distributes control information for controlling switching between the video stream and the alternative video. The information processing device includes a receiving portion, a storage portion, a video stream playback portion, an alternative video playback portion, and a playback switching control portion. The receiving portion receives the video stream, the alternative video, and the control information that are distributed from the video distribution server. The storage portion stores the alternative video and the control information that the receiving portion receives. The video stream playback portion performs streaming playback of the video stream that the receiving portion receives. The alternative video playback portion plays back the alternative video that is stored in the storage portion. The playback switching control portion, based on the control information that is stored in the storage portion, controls switching between the streaming playback in the video stream playback portion and the playback of the alternative video in the alternative video playback portion.

The video distribution server that is a configuring element of the video playback system can include the video distribution portion, the alternative video distribution portion, and the control information distribution portion. The video distribution portion can perform the streaming distribution of the video stream that includes the main content video and the commercial message video. The alternative video distribution portion can perform the file distribution of the alternative video that is the video for use in the video switching in the information processing device. The file distribution can be, for example, a distribution method in which the playback of the received alternative video is not performed in synchronization with the receiving of the alternative video in the information processing device that receives the alternative video that is distributed by the file distribution. Thus the file distribution can be different from the streaming distribution that is performed by the video distribution portion and that allows the distributed video stream to be played back in synchronization with the receiving of the video stream. The control information distribution portion can distribute the control information for performing the video switching in the information processing device.

Furthermore, the information processing device that is a configuring element of the video playback system can include the receiving portion, the storage portion, the video stream playback portion, the alternative video playback portion, and the playback switching control portion. The receiving portion can receive the video stream, the alternative video, and the control information that are distributed from the video distribution server. The storage portion can store the alternative video and the control information that the receiving portion receives. The video stream playback portion can perform the streaming playback of the video stream that the receiving portion receives. The alternative video playback portion can play back the alternative video that is stored in the storage portion. The playback switching control portion, based on the control information that is stored in the storage portion, can control the switching between the streaming playback in the video stream playback portion and the playback of the alternative video in the alternative video playback portion.

This configuration makes it possible to implement the video playback system in which it is possible in the information processing device to switch between the playback of the distributed video stream and the playback of the alternative video that is separate from the video stream.

According to the embodiments of the present invention described above, it is possible in the information processing device to switch between the playback of the distributed video stream and the playback of the alternative video that is separate from the video stream.

BRIEF DESCRIPTION OF THE DRAWINGS

FIG. 3A is an explanatory figure that shows a first example of video playback in an information processing device;

FIG. 3B is an explanatory figure that shows a second example of the video playback in the information processing device;

FIG. 4A is an explanatory figure that shows an example of control information according to the embodiments of the present invention;

FIG. 4B is an explanatory figure that shows an example of the control information according to the embodiments of the present invention;

FIG. 5 is an explanatory figure that shows an example of user information according to the embodiments of the present invention;

FIG. 9 is a flowchart that shows an example of video switchability determination processing according to the embodiments of the present invention; and FIG. 10 is a flowchart that shows an example of alternative video playback list creation processing according to the embodiments of the present invention.

DETAILED DESCRIPTION OF THE PREFERRED EMBODIMENTS

Figure 1:
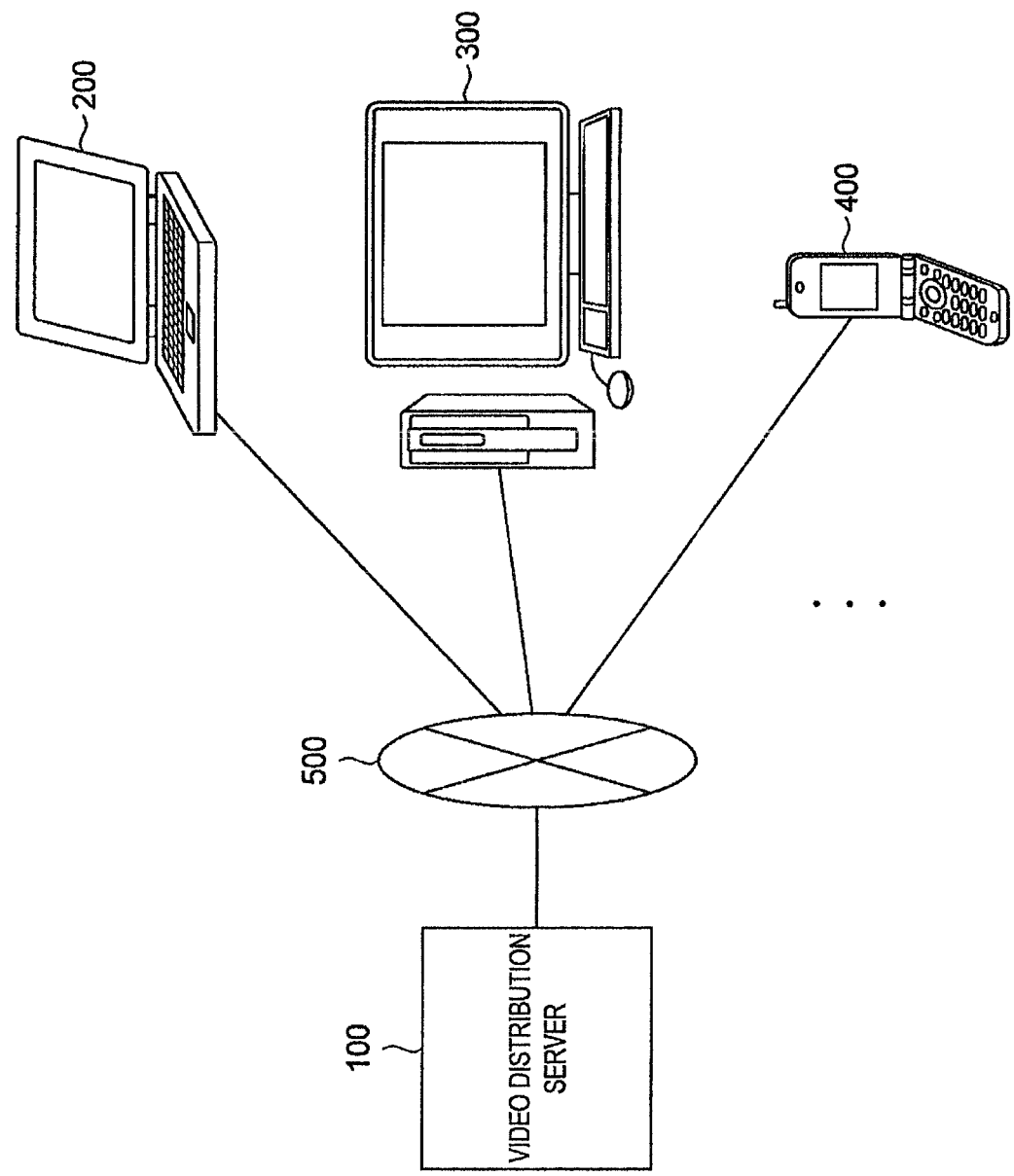
FIG. 1 is an explanatory figure that shows an overview of a video playback system according to embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Overview of a Video Playback System According to Embodiments of the Present Invention First, an overview of a video playback system according to embodiments of the present invention will be explained. FIG. 1 is an explanatory figure that shows the overview of the video playback system according to the embodiments of the present invention.

Referring to FIG. 1, the video playback system according to the embodiments of the present invention includes a video distribution server 100 that performs streaming distribution and information processing devices 200, 300, 400 and the like that play back video streams that are distributed by the video distribution server 100. As shown in FIG. 1, the information processing devices according to the embodiments of the present invention may be, for example, a portable computer (reference numeral 200) such as a laptop personal computer or the like, a desktop personal computer (reference numeral 300), a mobile communication device (reference numeral 400) such as a mobile telephone or the like, and the like, but the information processing devices are not limited to these examples.

The video distribution server 100 and the information processing devices 200, 300, 400 are connected, by wire or wirelessly, through a network 500 that uses the Transmission Control Protocol/Internet Protocol (TCP/IP). Note that the network 500 according to the embodiments of the present invention is not limited to being a network that uses the TCP/IP and can be, for example, a network that is capable of the streaming distribution of the video streams by the Real Time Streaming Protocol (RTSP) or the like. The distribution method may be, for example, a method that uses multicast and unicast, but it is not limited to this example.

Note that what is distributed by streaming from the video distribution server 100 is not limited to video, and may also be audio, for example. The video playback system according to the embodiments of the present invention will be explained in greater detail below using video as what is distributed from the video distribution server 100.

EMBODIMENT

Figure 2:
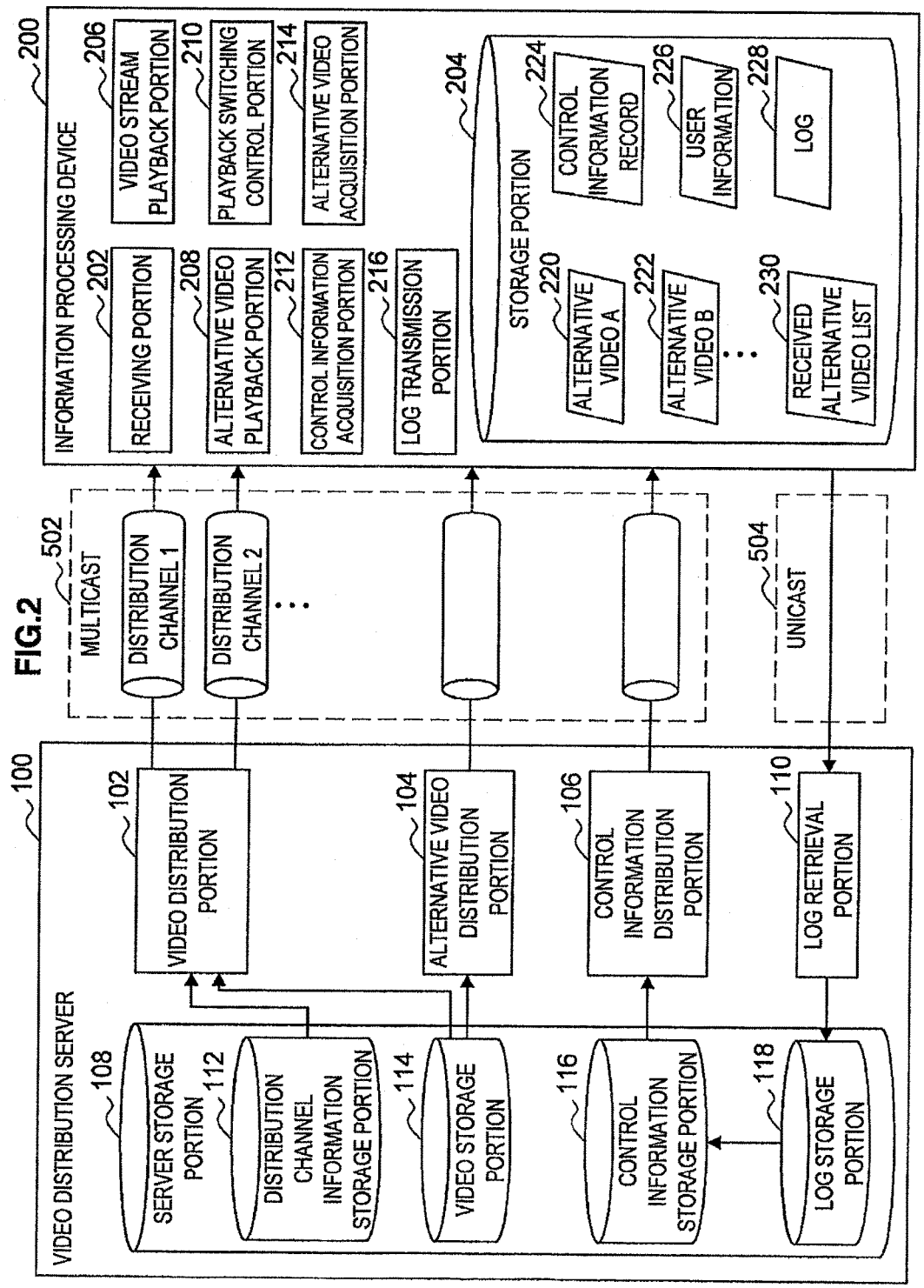
FIG. 2 is a block diagram that shows the video playback system according to the embodiments of the present invention.

FIG. 2 is a block diagram that shows the video playback system according to the embodiments of the present invention. FIG. 2 is an explanatory figure that shows a portion of the video playback system according to the embodiments of the present invention, showing the video distribution server 100 and the information processing device 200. The information processing devices 300, 400, and the like can be configured in basically the same manner as the information processing device 200, so explanation of the information processing devices 300, 400, and the like will be omitted hereafter.

The Video Distribution Server 100

Referring to FIG. 2, the video distribution server 100 can include a video distribution portion 102, an alternative video distribution portion 104, a control information distribution portion 106, a server storage portion 108, and a log retrieval portion 110. The video distribution server 100 may also include a server control portion (not shown in the drawings) that is configured from a micro processing unit (MPU) or the like and that controls the entire video distribution server 100. The video distribution server 100 may also include, for example, a read only memory (ROM) in which is stored control data that the server control portion uses, a server operation portion (not shown in the drawings) that can be operated by a manager who uses the video distribution server 100, and the like. The server control portion (not shown in the drawings) can also function as the video distribution portion 102, the alternative video distribution portion 104, the control information distribution portion 106, and the log retrieval portion 110, for example. Further, the server operation portion (not shown in the drawings) may be an operation input device such as a keyboard, a mouse, or the like, for example, but it is not limited to these examples.

The video distribution portion 102 can perform the streaming distribution of the video streams by a multicast method over individual distribution channels, as indicated by the reference numeral 502, for example. The video distribution portion 102 can also perform the distribution of the video streams over the individual distribution channels based on distribution channel information that is stored in a distribution channel information portion 112 (described later) of the server storage portion 108. The video distribution portion 102 can also acquire the video streams it will distribute from a video storage portion 114 (described later) of the server storage portion 108.

Each of the video streams that the video distribution portion 102 will distribute can include, for example, main content video such as a motion picture, a television program, or the like that is provided as a service to a user. Each of the video streams can also include, for example, commercial message video (video other than the main content video), such as commercial messages, promotional messages, motion picture trailers, news, and the like, that provides specified information (for example, product information, motion picture information, current events information, and the like) to the user who uses the information processing device 200.

The alternative video distribution portion 104 can distribute alternative video, which is video to which the information processing device 200 can switch from the commercial message video and play back. The alternative video distribution portion 104 can also acquire the alternative video it will distribute from the video storage portion 114 (described later) of the server storage portion 108.

The alternative video distribution portion 104 can also use technologies such as a carousel method and forward error correction (FEC) to distribute the alternative video by the multicast method, but it is obviously not limited to this distribution method. Note that the switching of videos in the information processing device 200 will be described later.

The alternative video that the alternative video distribution portion 104 distributes may include, for example, video such as commercial messages, promotional messages, motion picture trailers, and the like (that is, video that corresponds to the commercial message video) that provides specified information (for example, product information, motion picture information, and the like) to the user who uses the information processing device 200. However, the alternative video is not limited to these examples.

The control information distribution portion 106 can distribute control information that the information processing device 200 uses to switch from the commercial message video to the alternative video and play back the alternative video. The control information distribution portion 106 can also acquire the control information it will distribute from a control information storage portion 116 (described later) of the server storage portion 108.

The control information that the control information distribution portion 106 distributes can include, for example, distribution schedule information that contains information on a distribution schedule for the video streams, video stream detail information (FIG. 4A, for example) that provides details on the video streams, alternative video playback attribute information (FIG. 4B, for example) that prescribes an attribute for the alternative video that is distributed, and information such as an alternative video receiving schedule and the like that contains information on a distribution schedule for the alternative video.

The server storage portion 108 is a storage portion that is provided in the video distribution server 100. The server storage portion 108 can include the distribution channel information portion 112, the video storage portion 114, the control information storage portion 116, and a log storage portion 118. Note that in FIG. 2, the distribution channel information portion 112, the video storage portion 114, the control information storage portion 116, and the log storage portion 118 of the server storage portion 108 are shown as separate units, but the embodiments of the present invention are not limited to this example. The distribution channel information portion 112, the video storage portion 114, the control information storage portion 116, and the log storage portion 118 of the server storage portion 108 can be combined in a single unit, for example.

The distribution channel information portion 112 can store distribution channel information for use in the video distribution that is prescribed by the distribution schedule for each distribution channel, for example. The video storage portion 114 can store video data such as the video streams, the alternative video, and the like that will be distributed. The control information storage portion 116 can store the control information that will be distributed. The log storage portion 118 can store logs that are transmitted from the individual information processing devices and acquired by the log retrieval portion 110 (described later). The control information that is stored in the control information storage portion 116 may also be modified appropriately based on the logs that are stored in the log storage portion 118. The video distribution server 100 may also include, for example, a log analysis portion (not shown in the drawings) and a control information editing portion (not shown in the drawings), and the method of modifying the control information may be that the control information editing portion newly creates and edits the control information based on log analysis results from the log analysis portion, but the method of modifying the control information is not limited to this example. For example, the control information distribution portion 106 can also newly create and edit the control information.

The server storage portion 108 can also store the distribution channel information, the video streams, the alternative video, the control information, and the like that the video distribution server 100 acquires from an external device (not shown in the drawings) through a network or a storage medium such as a magneto optical disk or the like, but the server storage portion 108 is not limited to these examples. For example, the server storage portion 108 can also store the distribution channel information, the video streams, the alternative video, the control information, and the like that the video distribution server 100 creates.

The log retrieval portion 110 can retrieve the logs that are transmitted from the individual information processing devices and store them in the log storage portion 118. The log retrieval portion 110 may also include a storage section, for example, in which it retains the logs that it retrieves for a specified period. The log retrieval portion 110 may tabulate the log information for the specified period and then store the logs in the log storage portion 118 after tabulating them. The storage section that is provided in the log retrieval portion 110 may be, for example, a magnetic storage medium such as a hard disk or the like, or a non-volatile memory such as a flash memory or the like, but it is not limited to these examples.

The log retrieval portion 110 can also acquire the logs from the individual information processing devices by the unicast method, for example, as indicated by the reference numeral 504.

The Information Processing Device 200

The information processing device 200 can include a receiving portion 202, a storage portion 204, a video stream playback portion 206, an alternative video playback portion 208, a playback switching control portion 210, a control information acquisition portion 212, an alternative video acquisition portion 214, and a log transmission portion 216.

The information processing device 200 may also include a control portion (not shown in the drawings) that is configured from a micro processing unit (MPU) or the like and that controls the entire information processing device 200, a read only memory (ROM) in which is stored control data that the control portion uses, an operation portion (not shown in the drawings) that can be operated by the user, a display portion (not shown in the drawings) that displays the video streams and alternative video that are played back, and the like. The control portion (not shown in the drawings) can also function as the video stream playback portion 206, the alternative video playback portion 208, the playback switching control portion 210, the control information acquisition portion 212, the alternative video acquisition portion 214, and the log transmission portion 216. The operation portion (not shown in the drawings) may be a keyboard, a mouse, a direction key, a rotary selector such as a jog dial or the like, or any combination of these, for example. The display portion (not shown in the drawings) can be a display device such as a liquid crystal display (LCD), an organic electroluminescence (organic EL) display, an organic light emitting diode (OLED) display, or the like, for example. Note that the operation portion (not shown in the drawings) and the display portion (not shown in the drawings) can also be an integrated portion that is configured from a touch screen, for example.

The configuration described above makes it possible for the information processing device 200 to switch appropriately between and play back the video streams and the alternative video that are distributed from the video distribution server 100. Playback according to the embodiments of the present invention will be explained below as including decoding of video and displaying of decoded video. Note that the playback according to the embodiments of the present invention is not limited to these examples and can also include, for example, the playing back of decoded video (that is, the playing back and the displaying are distinct processes).

Overview of Video Playback in the Information Processing Device 200

Before the individual portions of the information processing device 200 are explained, an overview of video playback in the information processing device 200 will be provided with reference to FIGS. 3A to 3D. In FIGS. 3A to 3D, the main content video of the video stream that is distributed from the video distribution server 100 is called main content 1, main content 2, and the like, and the commercial message video is called CM1, CM2, and the like. Further, in FIGS. 3A to 3D, time flows from the top to the bottom of the drawings, and the thick lines indicate the video that the information processing device 200 is playing back.

(1) First Video Playback Example: Example in which Switching is not Performed

FIG. 3A is an explanatory figure that shows a first example of the video playback in the information processing device 200. FIG. 3A shows a case where the alternative video is not stored in the storage portion 204.

In the case where the alternative video is not stored in the storage portion 204, the information processing device 200 can start streaming playback at a video stream playback start time with the CM1 that has been distributed, then perform the video playback in the order of the distributed video stream, that is, the main content 1, the CM2, the main content 2, the CM3, the main content 3, and so on.

(2) Second Video Playback Example: Example in which the Switching of the Video is Performed FIG. 3B is an explanatory figure that shows a second example of the video playback in the information processing device 200. FIG. 3B shows an example in which the alternative video is stored in the storage portion 204 and the switching of the video is performed.

The information processing device 200 starts the streaming playback at the video stream playback start time with the CM1 that has been distributed, then plays back the main content 1. When the playback of the main content 1 is completed, the information processing device 200 does not play back the CM2 that is distributed by streaming, but plays back the alternative video that is stored in the storage portion 204 (for example, an alternative video A and an alternative video C) instead of the CM2. When the playback of the alternative video is completed, the information processing device 200 plays back the main content 2 that is distributed by streaming. Next, when the playback of the main content 2 is completed, the information processing device 200 does not play back the CM3 that is distributed by streaming, but plays back the alternative video that is stored in the storage portion 204 (for example, an alternative video D, an alternative video B, and an alternative video E) instead of the CM3. The video switching method according to the embodiments of the present invention will be described later.

Figure 3C:
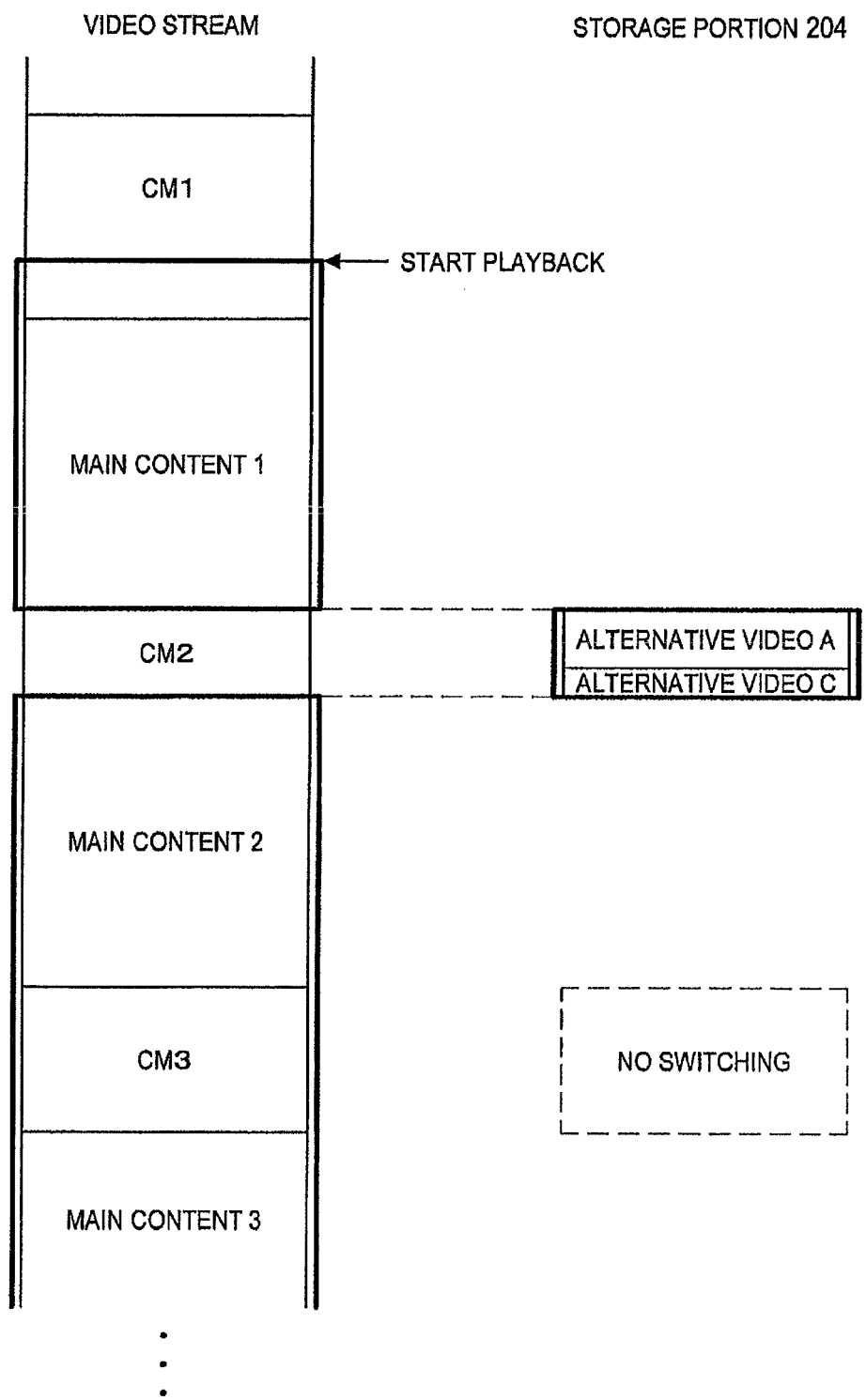
FIG. 3C is an explanatory figure that shows a third example of the video playback in the information processing device.

(3) Third Video Playback Example: Another Example in Which the Switching of the Video is Performed FIG. 3C is an explanatory figure that shows a third example of the video playback in the information processing device 200. FIG. 3B shows another example in which the alternative video is stored in the storage portion 204 and the switching of the video is performed.

The information processing device 200 starts the streaming playback at the video stream playback start time with the CM1 that has been distributed, then plays back the main content 1. When the playback of the main content 1 is completed, the information processing device 200 does not play back the CM2 that is distributed by streaming, but plays back the alternative video that is stored in the storage portion 204 (for example, the alternative video A and the alternative video C) instead of the CM2. When the playback of the alternative video is completed, the information processing device 200 plays back the main content 2 that is distributed by streaming. When the playback of the main content 2 is completed, the information processing device 200 plays back the CM3 that is distributed by streaming, without switching from the CM3 that is distributed by streaming to the alternative video. Next, the information processing device 200 plays back the main content 3. As shown in FIG. 3C, the information processing device 200 can also switch appropriately between the playback of the video streams and the playback of the alternative video.

Figure 3D:
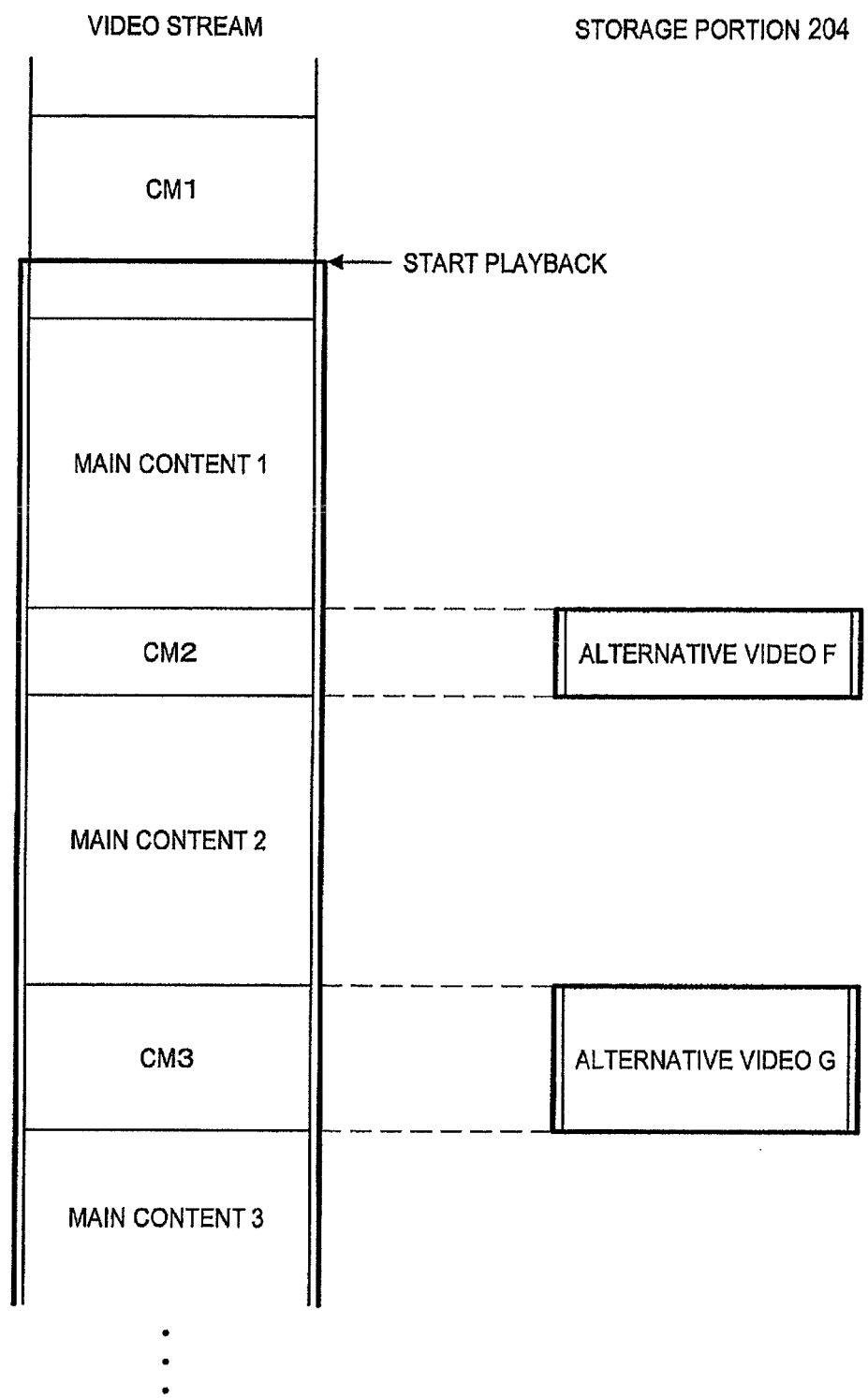
FIG. 3D is an explanatory figure that shows a fourth example of the video playback in the information processing device.

(4) Fourth Video Playback Example: Example in which the Video Stream Playback and the Alternative Video Playback are Both Performed FIG. 3D is an explanatory figure that shows a fourth example of the video playback in the information processing device 200. FIG. 3D shows an example in which the alternative video is stored in the storage portion 204 and the video stream playback and the alternative video playback are both performed.

The information processing device 200 starts the streaming playback at the video stream playback start time with the CM1 that has been distributed, then plays back the main content 1. When the playback of the main content 1 is completed, the information processing device 200 plays back the CM2 that is distributed by streaming and also plays back the alternative video that is stored in the storage portion 204 (for example, an alternative video F). At this time, the information processing device 200 can display both the CM2 and the alternative video separately on the display portion (not shown in the drawings). The information processing device 200 can also play back the CM2 that is distributed by streaming and the alternative video in a synchronized manner. When the playback of the CM2 and the alternative video is completed, the information processing device 200 plays back the main content 2 that is distributed by streaming. When the playback of the main content 2 is completed, the information processing device 200 plays back the CM3 that is distributed by streaming and also plays back the alternative video that is stored in the storage portion 204 (for example, an alternative video G). The information processing device 200 then plays back the main content 3. As shown in FIG. 3D, the information processing device 200 can also perform both the playback of the CM2 and the playback of the alternative video.

By playing back the alternative video that is related to the commercial message video of the video stream in a manner that is synchronized with the commercial message video, for example, the information processing device 200 can utilize a synergetic effect to increase the amount of information that the commercial message video provides to the user. It is possible to use an alternative attribute element that is prescribed by, for example, the control information (for example, FIG. 4B) and user information (for example, FIG. 5) to prescribe the relationship between the commercial message video of the video stream and the alternative video.

As shown in FIGS. 3A to 3D, the information processing device 200 according to the embodiments of the present invention can switch appropriately between the playback of the video stream and the playback of the alternative video. Therefore, by making the alternative video, for example, video that shows commercial messages, promotional messages, motion picture trailers, and the like that are matched to the user who uses the information processing device 200, and by switching between and playing back the commercial message video that is distributed by streaming and the alternative video, the information processing device 200 can provide to the user who uses the information processing device 200 video that is matched to the user.

Next, individual elements from which the information processing device 200 is configured will be explained with reference to FIG. 2 once more.

The receiving portion 202 is a portion by which the information processing device 200 connects to the network 500 and can receive the video streams, the alternative videos, the control information, and the like that are distributed from the video distribution server 100. The receiving portion 202 can also have a form and a function that are suited to the network 500.

The storage portion 204 is storage section that is provided in the information processing device 200. The storage portion 204 can store, for example, an alternative video A 220, an alternative video B 222, and the like, a control information record 224, user information 226, a log 228, and a received alternative video list 230 (described later). Note that in FIG. 2, only one control information record 224 is shown, but the information processing device 200 can store a plurality of the control information records that correspond to the distribution channels. Furthermore, the information that is stored in the storage portion 204 is not limited to the information shown in FIG. 2. For example, the storage portion 204 can store information that is acquired (extracted) from within the control information (for example, distribution schedule information that indicates a distribution schedule for the video streams, an alternative video distribution schedule that indicates a distribution schedule for the alternative video, and the like). The storage portion 204 can also store information that pertains to a user operation in the video playback (for example, information that pertains to operation of an application), but the information that is stored in the storage portion 204 is obviously not limited to these examples. Examples of the control information and the user information according to the embodiments of the present invention will be explained below.

Examples of the Control Information

FIGS. 4A and 4B are explanatory figures that show examples of the control information according to the embodiments of the present invention. The control information record according to the embodiments of the present invention can contain at least one information item. For example, FIG. 4A is an explanatory figure that shows the video stream detail information that shows details of the video stream that is distributed from the video distribution server 100. FIG. 4B is an explanatory figure that shows the alternative video playback attribute information that indicates the attributes of the individual alternative videos that are distributed from the video distribution server 100.

Referring to FIG. 4A, the video stream detail information can include such information as, for example, a content data ID for identifying each of the main content videos and commercial message videos that are included in the video stream, a playback time for each of the main content videos and commercial message videos, a content type that indicates a type for each of the main content videos and commercial message videos, and a switchability flag that indicates whether or not the video can be switched.

The information processing device 200 can use the video stream detail information in determining whether or not to switch the video. (The determination of whether or not to switch the video will be described later.)

Referring to FIG. 4B, the alternative video playback attribute information can be expressed in the form of a markup language, for example. (For example, in the expression "alternative CM element (1) ... alternative CM element (N)", N is a positive integer.) For each alternative video (each alternative CM element), the alternative video playback attribute information can include such information as, for example, a content data ID for identifying the alternative video, an alternative attribute element that indicates an attribute of the alternative video, an upper limit playback times that prescribes an upper limit on the number of times that the alternative video can be played back in the information processing device 200, a period of use that prescribes a period during which the alternative video can be played back, a playback priority that prescribes a priority for the playback of the alternative video, and the like. The attribute of the alternative video may be, for example, information pertaining to gender, such as whether the video is intended for a male viewer or a female viewer, information pertaining to an age range for which the video is intended, information on the genre of the video, or the like, but the attribute of the alternative video is not limited to these examples.

The various types of information that are included in the alternative video playback attribute information, such as the upper limit playback times, the period of use, the playback priority, and the like, can be set by the control information distribution portion 106 of the video distribution server 100, based on the logs that the log retrieval portion 110 of the video distribution server 100 retrieves from the individual information processing devices, for example, but the setting of the various types of information is not limited to this example. For example, the various types of information can also be set by the manager who uses the video distribution server 100, using the server operation portion (not shown in the drawings) that is provided in the video distribution server 100.

The information processing device 200 can use the alternative video playback attribute information and the user information that will be described later to acquire the alternative videos selectively. (The acquisition of the alternative videos will be described later.)

The information processing device 200 can use the control information like that shown in FIGS. 4A and 4B to perform the acquisition of the alternative videos and the switching of the videos. Note that the control information according to the embodiments of the present invention is obviously not limited to the examples shown in FIGS. 4A and 4B.

Example of the User Information

FIG. 5 is an explanatory figure that shows an example of the user information according to the embodiments of the present invention.

Referring to FIG. 5, the user information can be expressed in the form of a markup language, for example. The user information can include a user ID for identifying the user and an alternative attribute element that indicates an attribute of the alternative video to be acquired. In the same manner as the alternative video playback attribute information shown in FIG. 4B, the attribute of the alternative video to be acquired may be, for example, information pertaining to gender, information pertaining to a target age range, information on the genre of the video, or the like, but the attribute of the alternative video to be acquired is not limited to these examples. Setting the alternative attribute element makes it possible for the information processing device 200 to selectively acquire the alternative videos that are distributed from the video distribution server 100, based on the alternative attribute element that is set.

The user can also set the user information by using the operation portion (not shown in the drawings) of the information processing device 200. Note that the user information according to the embodiments of the present invention is obviously not limited to the example shown in FIG. 5.

The storage portion 204 can store the control information and the user information as shown in FIGS. 4A, 4B, and 5. The storage portion 204 may be, for example, a magnetic storage medium such as a hard disk or the like, a non-volatile memory such as an electrically erasable programmable read-only memory (EEPROM), a flash memory, a magnetoresistive random access memory (MRAM), a ferroelectric random access memory (FeRAM), a phase change random access memory (PRAM), or the like, a magneto-optical disk, or the like, but it is not limited to these examples.

The information processing device 200 will be explained with reference once more to FIG. 2. The video stream playback portion 206 performs streaming playback of the video streams that are distributed from the video distribution server 100. The streaming playback in the video stream playback portion 206 can be implemented by one or both of hardware (hardware decoding) and software (software decoding). In a case where the streaming playback in the video stream playback portion 206 is implemented by software, the information processing device 200 can use the operation portion (not shown in the drawings), for example, to control the video stream playback portion 206.

In addition to playing back the video streams that are distributed from the video distribution server 100, the video stream playback portion 206 can also store the video streams in the storage portion 204. The video stream playback portion 206 can perform the playback of the video streams that are stored in the storage portion 204 in the same manner as it performs the playback of the video streams that are distributed from the video distribution server 100. Therefore, in the embodiments of the present invention, the switching of the videos that are played back, as shown in FIGS. 3A to 3D, can be performed not only in the playback of the video streams that are distributed from the video distribution server 100, but also in the playback of the video streams that are stored in the storage portion 204. A case where the video stream playback portion 206 plays back the video streams that are distributed from the video distribution server 100 will be explained below as an example.

The alternative video playback portion 208 can play back the alternative videos that are stored in the storage portion 204. The playback of the alternative videos by the alternative video playback portion 208, in the same manner as in the video stream playback portion 206, can be implemented by one or both of hardware and software.

The playback switching control portion 210 can switch between the playback of the video stream and the playback of the alternative video, based on the control information that is stored in the storage portion 204. (The switching method will be described later.)

The control information acquisition portion 212 can acquire the control information that is distributed from the video distribution server 100. The control information acquisition portion 212 may acquire the control information by acquiring it over the network 500 through the receiving portion 202 on a fixed cycle. The control information acquisition portion 212 can also acquire the control information in response to a control information acquisition command that is transmitted from the operation portion (not shown in the drawings). An example of the processing in the control information acquisition portion 212 will be explained below with reference to FIG. 6.

Example of the Processing in the Control Information Acquisition Portion 212

Figure 6:
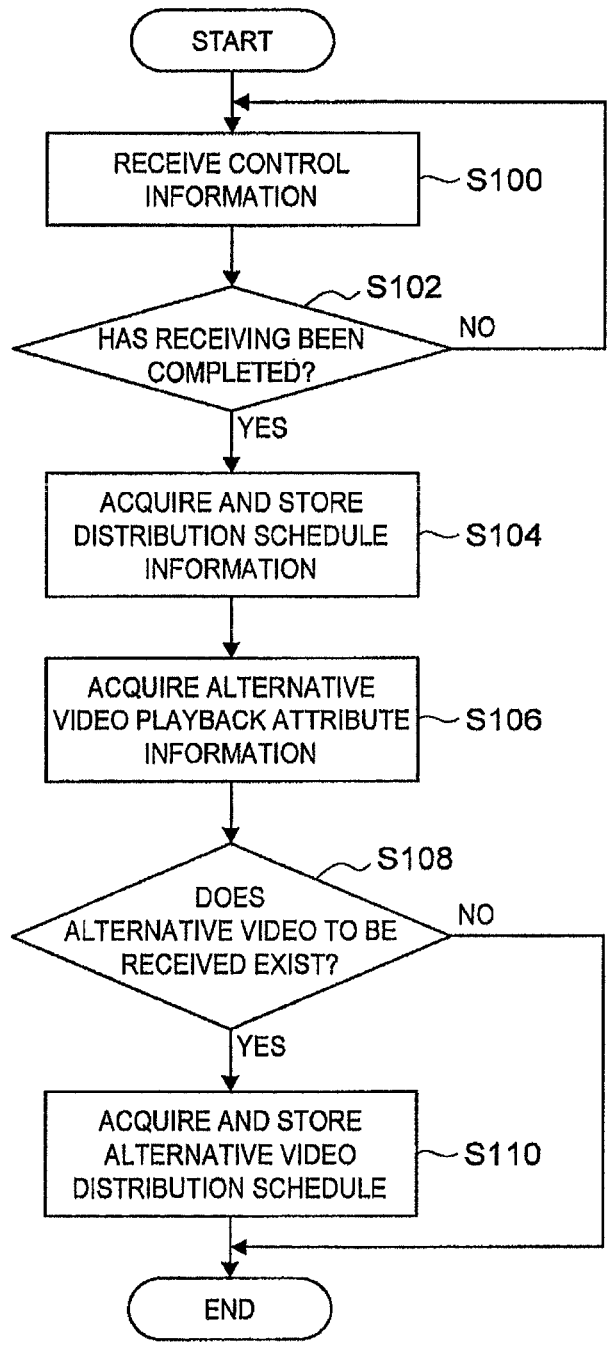
FIG. 6 is a flowchart that shows an example of processing in a control information acquisition portion according to the embodiments of the present invention.

FIG. 6 is a flowchart that shows an example of the processing in the control information acquisition portion 206 according to the embodiments of the present invention.

First, the control information acquisition portion 212 starts the acquisition of the control information and receives the control information (step S100).

When the control information is received at step S100, the control information acquisition portion 212 determines whether or not the receiving of the control information has been completed (step S102). The determination at step S102 can be made by one of determining whether or not information that indicates the end of the control information is included in the received control information and determining whether a result of a cyclic redundancy check (CRC) of the received control information is normal or not, but the determination at step S102 is not limited to these examples. In a case where it is determined at step S102 that the receiving of the control information has not been completed, the processing at step S100 is repeated.

In a case where it is determined at step S102 that the receiving of the control information has been completed, the control information acquisition portion 212 acquires the distribution schedule information (not shown in the drawings) from within the received control information and stores the distribution schedule information in the storage portion 204 (step S104). The distribution schedule information is information on the distribution schedule for the video streams that shows, for example, what sorts of video stream content will be distributed from the video distribution server 100 at what times. In FIG. 6, the word "acquire" indicates the extracting from within the control information of information that is contained in the control information.

The control information acquisition portion 212 also acquires the alternative video playback attribute information (for example, FIG. 4B) from within the received control information (step S106). In FIG. 6, step S106 is shown after step S104, but the order of step S104 and step S106 can be reversed, and step S104 and step S106 can also be performed in a synchronized manner.

Based on the alternative video playback attribute information that was acquired at step S106, the control information acquisition portion 212 determines whether or not an alternative video exists for the information processing device 200 to receive [determination of object to receive] (step S108). The determination at step S108 can be made for each alternative video by comparing the alternative attribute element in the alternative video playback attribute information with the alternative attribute element in the user information and determining whether or not they match. In a case where it is determined at step S108 that an alternative video to be received does not exist, the control information acquisition portion 212 terminates the processing.

In a case where it is determined at step S108 that an alternative video to be received does exist, the control information acquisition portion 212 acquires the alternative video receiving schedule (not shown in the drawings) and stores it in the storage portion 204 (step S110). The alternative video receiving schedule is information on the distribution schedule for the alternative videos that shows, for example, what sorts of alternative video content will be distributed from the video distribution server 100 at what times.

The control information acquisition portion 212 can also acquire the control information and perform the various processes that are shown in FIG. 6, for example.

Refer once more to FIG. 2. The alternative video acquisition portion 214 can acquire the alternative videos that are distributed from the video distribution server 100 through the receiving portion 202, based on the alternative video receiving schedule (not shown in the drawings) that is stored in the storage portion 204. An example of the processing in the alternative video acquisition portion 214 will be explained below with reference to FIG. 7.

Example of the Processing in the Alternative Video Acquisition Portion 214

Figure 7:
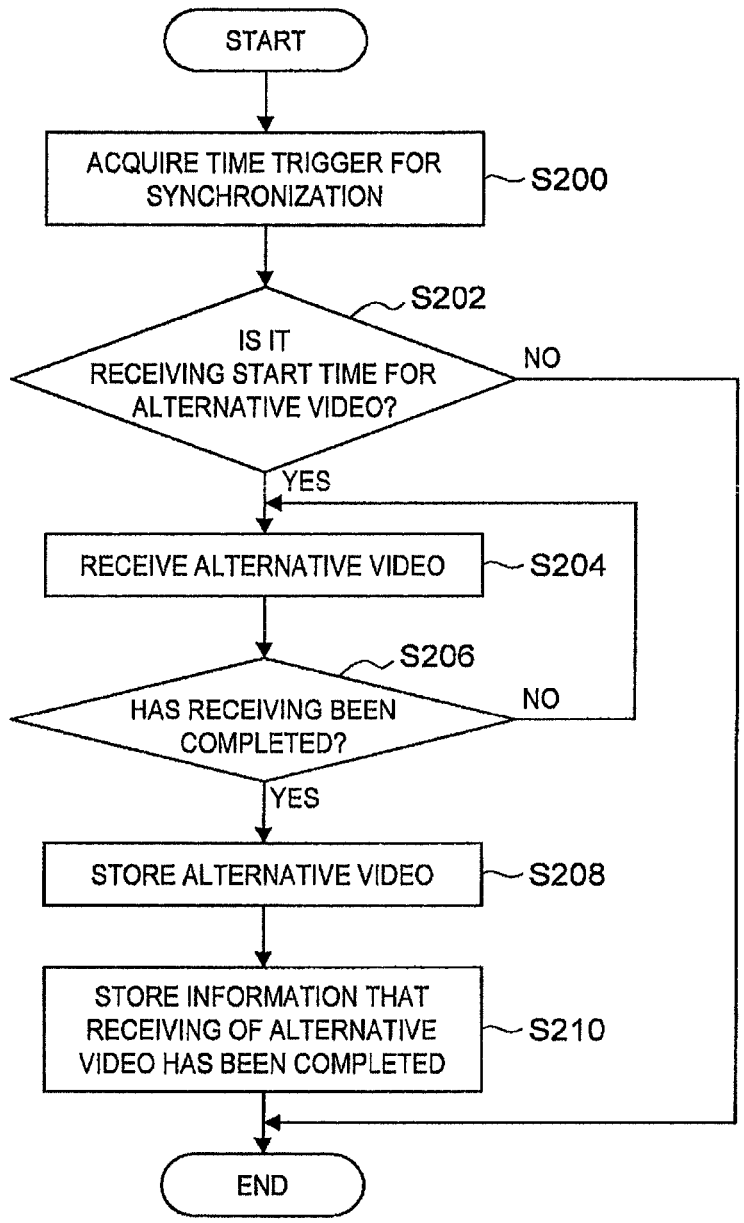
FIG. 7 is a flowchart that shows an example of processing in a alternative video acquisition portion according to the embodiments of the present invention.

FIG. 7 is a flowchart that shows an example of processing in the alternative video acquisition portion 214 according to the embodiments of the present invention. Note that the processing in the alternative video acquisition portion 214 that is shown in FIG. 7 is not a type of processing that terminates after being performed once, but is processing that is performed any number of times.

First, the alternative video acquisition portion 214 acquires a time trigger for synchronization (step S200). The time trigger for synchronization is information for synchronizing the times of the video distribution server 100 and the information processing device 200, and it can be acquired from the video distribution server 100, for example. Note that the acquisition of the time trigger for synchronization at step S200 is not limited to this example. For example, the video playback system shown in FIG. 1 can also include a time synchronization server (not shown in the drawings) for synchronizing the times of both the video distribution server 100 and the information processing device 200, and the alternative video acquisition portion 214 can also acquire the time trigger for synchronization from the time synchronization server.

Based on the time trigger for synchronization that was acquired at step S200, the alternative video acquisition portion 214 determines whether or not the current time is the receiving start time for the alternative video (S202). The determination at step S202 can be made by using the alternative video receiving schedule, for example. In a case where it is determined at step S202 that the current time is not the receiving start time for the alternative video, the alternative video acquisition portion 214 terminates the processing.

In a case where it is determined at step S202 that the current time is the receiving start time for the alternative video, the alternative video acquisition portion 214 receives the alternative video (step S204).

When the alternative video is received at step S204, the alternative video acquisition portion 214 determines whether or not the receiving of the alternative video has been completed (step S206). The determination at step S206 can be made by determining whether the length of the received alternative video matches the length of the alternative video that is included in the alternative video receiving schedule, for example. The determination at step S206 can also be made by determining whether a result of a CRC of the received alternative video is normal or not, but the determination at step S206 is not limited to these examples. In a case where it is determined at step S206 that the receiving of the alternative video has not been completed, the processing at step S204 is repeated.

In a case where it is determined at step S206 that the receiving of the alternative video has been completed, the alternative video acquisition portion 214 stores the alternative video in the storage portion 204 (step S208).

When the storing of the alternative video at step S208 has been completed, the alternative video acquisition portion 214 stores information to the effect that the receiving of the alternative video has been completed (step S210), then terminates the processing. The alternative video acquisition portion 214 can perform the processing at step S210 by editing (or newly creating) the received alternative video list 230 that is stored in the storage portion 204. The alternative video acquisition portion 214 can store in the received alternative video list 230 the content data ID for identifying the alternative video, information (for example, an address or the like) on the location in the storage portion 204 where the alternative video is stored, the playback time of the alternative video, and the like, but the information that is stored in the received alternative video list 230 is not limited to these examples.

The alternative video acquisition portion 214 can perform the acquisition of the alternative video and the storing in the storage portion 204 by the various processes shown in FIG. 7.

Refer once more to FIG. 2. The log transmission portion 216 transmits to the video distribution server 100 the log 228 that is stored in the storage portion 204. The log transmission portion 216 may perform the transmission of the log on a fixed cycle, and it can also transmit the log in response to a log xmincmd that is transmitted from the operation portion (not shown in the drawings). Note that in FIG. 2, only one log 228 is shown, but the log according to the embodiments of the present invention is not limited to this example, and the storage portion 204 can also store one log for each of the alternative videos (that is, a plurality of the logs), for example.

The configuration described above makes it possible for the information processing device 200 to perform the acquisition and the storage of the control information, the acquisition and the storage of the alternative videos, the streaming playback of the video streams, the playback of the alternative videos, the switching of the playback of the video streams and the alternative videos, and the like.

Video Playback Method

Figure 8:
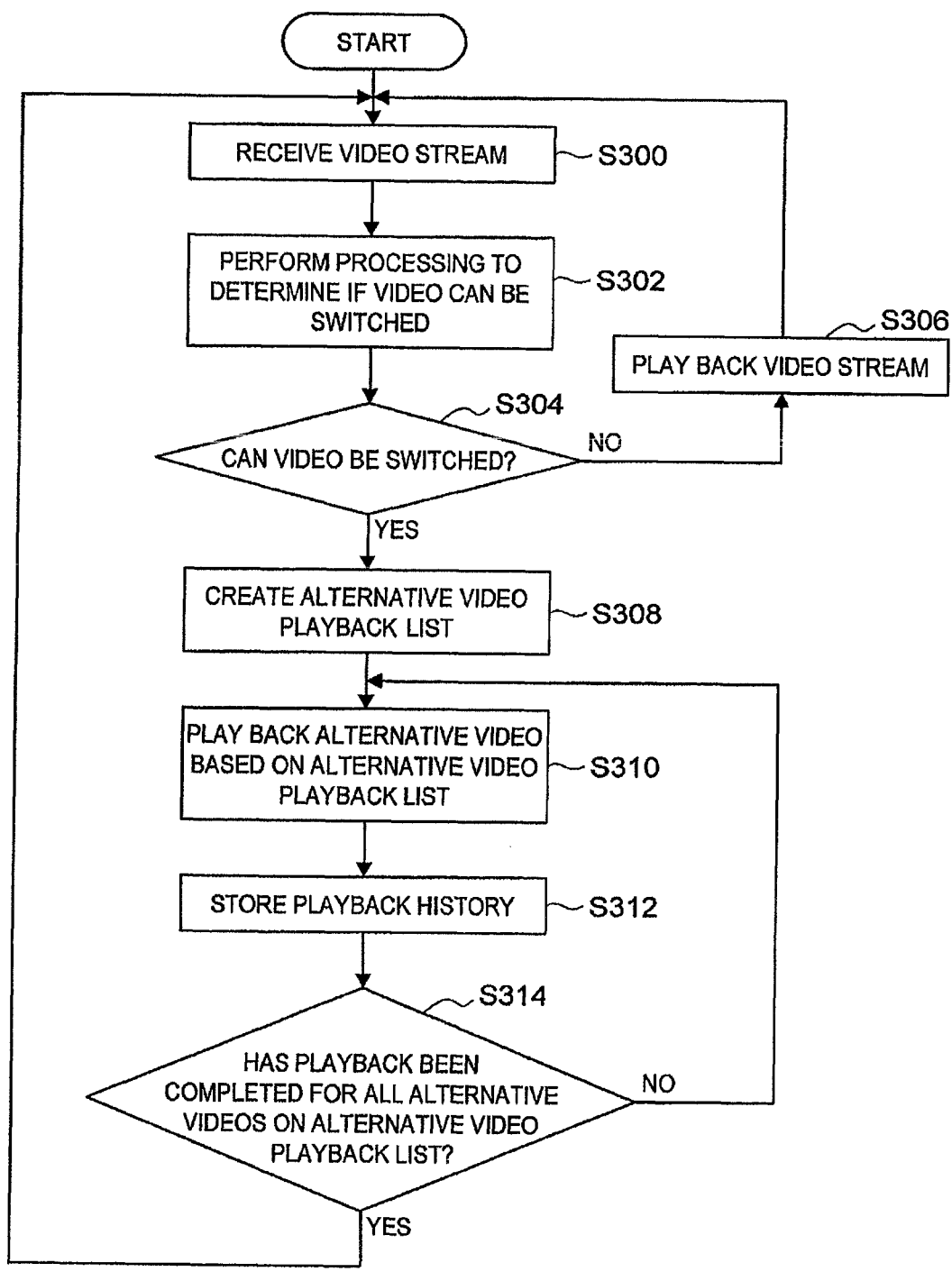
FIG. 8 is a flowchart that shows an example of a video playback method according to the embodiments of the present invention.

Next, a video playback method according to the embodiments of the present invention will be explained. FIG. 8 is a flowchart that shows an example of the video playback method according to the embodiments of the present invention.

First, the information processing device 200 receives the video stream (step S300). Once the receiving of the video stream has started at step S300, the information processing device 200 performs processing to determine whether or not the video can be switched (step S302). The determination at step S302 can be made using a flag that indicates whether or not the video can be switched, for example. An example of the determination processing at step S302 (video switchability determination processing) will be explained below with reference to FIG. 9.

Example of Video Switchability Determination Processing

FIG. 9 is a flowchart that shows an example of the video switchability determination processing according to the embodiments of the present invention. The video switchability determination processing that is shown in FIG. 9 can be performed by the playback switching control portion 210 of the information processing device 200, for example.

First, the information processing device 200 acquires the content data ID for the video stream (step S400). Then the information processing device 200 acquires a playback position for the video stream (step S402).

Based on the content data ID and the playback position that were acquired at steps S400 and S402, the information processing device 200 determines whether or not the playback of the main content video has ended (step S404). For example, at step S404, the information processing device 200 can determine that the playback of the main content video has not ended (i) in a case where the content data ID that was acquired at step S400 indicates a commercial message video and (ii) in a case where the content data ID that was acquired at step S400 indicates a main content video, but the playback position that was acquired at step S402 is midway within the main content video. In a case where it is determined at step S404 that the playback of the main content video has not ended, the processing at steps S402 and S404 is repeated.

In a case where it is determined at step S404 that the playback of the main content video has ended, the information processing device 200 determines whether or not the next content in the video stream is a commercial message video (step S406). The determination at step S406 can be made, for example, by using the content data ID that was acquired at step S400 and the video stream detail information (for example, the content type in FIG. 4A) that is included in the control information that is stored in the storage portion 204.

In a case where it is determined at step S406 that the next content is not a commercial message video, the information processing device 200 outputs a not switchable flag that indicates that the switching of the video will not be performed (step S412).

In a case where it is determined at step S406 that the next content is a commercial message video, the information processing device 200 determines whether or not the switching of the video is possible (step S408). The information processing device 200 can make the determination at step S408 in the same manner as the determination at step S406, for example, by using the content data ID that was acquired at step S400 and the video stream detail information (for example, the content type in FIG. 4A) that is included in the control information that is stored in the storage portion 204.

In a case where it is determined at step S408 that the switching of the video is not possible, the information processing device 200 outputs the not switchable flag that indicates that the switching of the video will not be performed (step S412).

In a case where it is determined at step S408 that the switching of the video is possible, the information processing device 200 outputs a switchable flag that indicates that the switching of the video is possible (step S410).

The information processing device 200 can output one of the switchable flag and the not switchable flag by performing processing like that shown in FIG. 9, for example. It is therefore possible for the information processing device 200 to determine whether or not the switching of the video is possible, based on the flags. The switchable flag can be set to a value for a specified processing mode, for example. The specified processing mode may be, for example, processing that switches to and plays back the alternative video (for example, FIG. 3B), processing that plays back both the video stream and the alternative video (for example, FIG. 3D), or the like, but the specified processing mode is not limited to these examples. The not switchable flag can be set to a specified value that indicates that the switching of the video will not be performed. Note that the flags according to the embodiments of the present invention are not limited to being separate flags that are called the switchable flag and the not switchable flag. For example, the flags may also be a flag value that is expressed by a single bit (for example, 0 for switchable and 1 for not switchable). Even in this case the information processing device 200 can perform the determination of whether or not the switching of the video is possible based on the flags.

The video playback method according to the embodiments of the present invention will be explained with reference once more to FIG. 8. The information processing device 200, having received the result of the processing at step S302, determines whether or not the switching of the video is possible (step S304). The determination at step S304 can be made based on a flag (for example, one of the switchable flag and the not switchable flag).

In a case where it is determined at step S304 that the switching of the video is not possible, the information processing device 200 plays back the video stream without performing the switching of the video (step S306). The processing at step S300 is then repeated. Note that the playback at step S306 is streaming playback, so the playback is performed in synchronization with the receiving of the video stream, but steps S306 and S300 are shown as separate steps in FIG. 8 for the sake of convenience.

In a case where it is determined at step S304 that the switching of the video is possible, the information processing device 200 creates an alternative video playback list for the switching of the video (step S308). The creation of the alternative video playback list at step S308 can be done by using, for example, the received alternative video list 230 that is stored in the storage portion 204, the video stream detail information (for example, FIG. 4A) that is contained in the control information record 224 that is stored in the storage portion 204, the alternative video playback attribute information (for example, FIG. 4B) that is contained in the control information record 224, and the log 228 that is stored in the storage portion 204. An example of the alternative video playback list creation processing at step S308 will be explained below with reference to FIG. 10.

Example of the Alternative Video Playback List Creation Processing

FIG. 10 is a flowchart that shows the example of the alternative video playback list creation processing according to the embodiments of the present invention. The alternative video playback list creation processing that is shown in FIG. 10 can be performed by the playback switching control portion 210 of the information processing device 200, for example.

First, the information processing device 200 acquires the received alternative video list 230 that is stored in the storage portion 204 (step S500). The information processing device 200 then selects one of the alternative videos from the received alternative video list 230 that was acquired at step S500 (step S502). The selection of the alternative video at step S502 may be made by acquiring from the received alternative video list 230 the content data ID and the information on the storage location in the storage portion 204 for the alternative video, for example, but the selection of the alternative video is not limited to this example.

Further, the selection at step S502 can be made by sequentially accessing the received alternative video list 230 and sequentially making the selection, but the selection is not limited to this example. For example, the information processing device 200 can also make the selection by random access, based on the playback priority in the alternative video playback attribute information (for example, FIG. 4B) that is contained in the control information record 224.

With respect to the alternative video that was selected at step S502, the information processing device 200 determines (I) whether or not a switching stop command is in effect (step S504), (II) whether or not the number of playback times is not greater than the upper limit playback times (step S506), and (III) whether or not the receiving of the alternative video has been completed (step S508). The determinations at steps S504 and S506 can be made using the alternative video playback attribute information (for example, FIG. 4B) and a playback history (described later) that is stored in the log 228, for example. The determination at step S508 can be made, for example, by using the information on the storage location in the storage portion 204 that was acquired from the received alternative video list 230 to determine whether or not the alternative video is actually stored in the storage portion 204.

Note that the determinations that are made with respect to the alternative video that was selected at step S502 are obviously not limited to the determinations at steps S504, S506, and S508. For example, the information processing device 200 can also determine whether or not the period of use has elapsed for the alternative video that was selected at step S502, based on the alternative video playback attribute information (for example, FIG. 4B).

In a case where it is determined at step S504 that the switching stop command is in effect, in a case where it is determined at step S506 that the number of playback times is greater than the upper limit playback times, and in a case where it is determined at step S508 that the receiving of the alternative video has not been completed, the information processing device 200 repeats the processing that starts at step S502.

Further, in a case where it is determined at step S508 that the receiving of the alternative video has been completed, the information processing device 200 sets the alternative video that was selected at step S502 as the alternative video to be played back (step S510). The setting at step S510 can be done by one of newly creating the alternative video playback list and adding to the alternative video playback list.

Once the alternative video that was selected at step S502 is set as the alternative video to be played back at step S510, the information processing device 200 determines whether or not more switching of the video is possible (step S512). The determination at step S512 can be made, for example, by determining whether or not the cumulative total playback time of the alternative videos that have been set as the alternative videos to be played back at step S510 is not greater than the playback time in the video stream detail information (for example, FIG. 4A) that is contained in the control information record 224 that is stored in the storage portion 204. The cumulative total playback time of the alternative videos that have been set as the alternative videos to be played back at step S510 can be computed based on the playback times for each of the alternative videos that are entered in the received alternative video list 230.

In a case where it is determined at step S512 that more switching of the video is possible, the processing is repeated starting from step S502.

In a case where it is determined at step S512 that more switching of the video is not possible, the alternative video playback list is output in which are entered the alternative videos that were set at step S510 (step S514).

The information processing device 200 can create and output the alternative video playback list by performing the processing like that shown in FIG. 10, for example.

The video playback method according to the embodiments of the present invention will be explained with reference once more to FIG. 8. Based on the alternative video playback list that was created at step S308, the information processing device 200 plays back the alternative video (step S310).

Once the playback of one alternative video at step S310 has been completed, a playback history for the alternative video is stored (step S312). The playback history at step S312 can be stored in the log 228 in the storage portion 204, for example. At step S312, the information processing device 200 can also store as the playback history, for example, information that indicates the number of times that the playback of the alternative video has been completed (for example, by adding 1 to a cumulative total every time the playback is completed). In a case where the period of use has elapsed after the alternative video is played back, the information processing device 200 can also store as the playback history, for example, information on a switching stop command for stopping any subsequent playback, or the like. Note that it is obvious that the playback history according to the embodiments of the present invention is not limited to these examples.

Once the playback of the one alternative video at step S310 has been completed, the information processing device 200 determines whether or not the playback has been completed for all of the alternative videos in the alternative video playback list (step S314). In a case where it is determined at step S314 that the playback has not been completed for all of the alternative videos, the processing is repeated starting from step S310.

In a case where it is determined at step S314 that the playback has been completed for all of the alternative videos, the playback of the alternative videos is terminated. Then the processing is repeated starting from step S300. Note that the information processing device 200 according to the embodiments of the present invention can be provided with the video stream playback portion 206 and the alternative video playback portion 208, so it is possible for the receiving of the video streams to continue, even in a case where the alternative videos are being played back. Therefore, even though step S300 (the video stream receiving processing) and steps S308 to S314 (the processing involved in the playback of the alternative videos) are shown as separate in FIG. 8 for the sake of convenience, it is obvious that the video playback method according to the embodiments of the present invention can perform the processing at step S300 (and also perform the decoding of the received video streams) even while the processing at steps S308 to S314 is being performed.

As shown with reference to FIGS. 8 to 10, the video playback method according to the embodiments of the present invention can determine, once a video stream is received, whether or not the video can be switched. Based on the result of that determination, the video playback method can switch between the playback of the video stream and the playback of the alternative video, and it can also play back both the video stream and the alternative video.

Therefore, using the video playback method according to the embodiments of the present invention makes it possible to provide the user with video that is matched to the information processing device that plays back the video stream (that is, video that is directed to the user of the information processing device).

Thus, in the video playback system according to the embodiments of the present invention, the information processing devices 200, 300, 400 and the like can each receive the control information that is distributed from the video distribution server 100, and based on the control information, each information processing device can selectively receive and store the alternative video that is distributed from the video distribution server 100. Each information processing device can then determine, in a case where it plays back the video stream that is distributed from the video distribution server 100, whether or not the switching of the video is possible. Based on the result of that determination, each information processing device can switch between the playback of the video stream and the playback of the alternative video, and it can also play back both the video stream and the alternative video.

Therefore, the video playback system according to the embodiments of the present invention can provide the user with video that is matched to the information processing device that plays back the video stream (that is, video that is directed to the user of the information processing device).

Furthermore, in a case where the playback of the alternative video is performed, each of the information processing devices that are configuring elements of the video playback system according to the embodiments of the present invention store the playback history and transmit the log in which the history is stored to the video distribution server 100. Then the video distribution server 100 that has retrieved the log that was transmitted from each information processing device can create and edit the control information based on the retrieved log. The video playback system according to the embodiments of the present invention can therefore provide to the user, in a flexible manner, the alternative video that is matched to the information processing device that plays back the video stream.

Moreover, unlike the known video playback system, the video playback system according to the embodiments of the present invention does not have to perform the insertion (editing) of the video to be played back, whether on the video stream distribution side (that is, the video distribution server 100) or on the video stream playback side (that is, the information processing devices 200, 300, 400, and the like). Therefore, the video distribution server 100 that is a configuring element of the video playback system according to the embodiments of the present invention is not required to distribute a video stream that is matched to each individual information processing device. In addition, each of the information processing devices that are configuring elements of the video playback system according to the embodiments of the present invention can appropriately switch to and play back the alternative video without performing the insertion (editing) of the video to be played back, so the video that is played back does not have to be the fixed video, as it does in the known information processing device. Furthermore, in a case where the alternative video has not been stored in the storage portion of the information processing device, for example, each of the information processing devices that are configuring elements of the video playback system according to the embodiments of the present invention can provide the user with video that is matched to the information processing device by appropriately switching the video, such as by playing back the distributed video stream in its existing form, and the like. Therefore, each of the information processing devices that are configuring elements of the video playback system according to the embodiments of the present invention can play back the video stream that is distributed from the video distribution server 100 and also play back the alternative video.

The video distribution server 100 has been explained as a configuring element of the video playback system according to the embodiments of the present invention, but the embodiments of the present invention are not limited to this form. For example, the present invention can also be applied to a computer such as a server, a personal computer, or the like.

Program According to the Embodiments of the Present Invention

A program that causes a computer to function as the information processing device 200, 300, 400, or the like according to the embodiments of the present invention can switch between the playback of the video stream and the playback of the alternative video, and it can also play back both the video stream and the alternative video.

It should be understood by those skilled in the art that various modifications, combinations, sub-combinations and alterations may occur depending on design requirements and other factors insofar as they are within the scope of the appended claims or the equivalents thereof.

For example, in FIG. 2, the video distribution server 100 that is a configuring element of the video playback system is shown as being configured to include the video distribution portion 102, the alternative video distribution portion 104, the control information distribution portion 106, the log retrieval portion 110, and the like, but the embodiments of the present invention are not limited to this configuration. For example, in the video playback system according to the embodiments of the present invention, each of the video distribution portion, the alternative video distribution portion, the control information distribution portion, and the log retrieval portion can also be configured as a separate server device. Even in the current configuration, the video playback system can perform the distribution of the video stream, the alternative video, and the control information, respectively, and can also retrieve the log that is transmitted from each information processing device.

Furthermore, in FIG. 2, the information processing device 200 that is a configuring element of the video playback system is shown as being configured to include the video stream playback portion 206, the alternative video playback portion 208, the playback switching control portion 210, the control information acquisition portion 212, the alternative video acquisition portion 214, and the log transmission portion 216, but the embodiments of the present invention are not limited to this configuration. For example, in the information processing device according to the embodiments of the present invention, the video stream playback portion, the alternative video playback portion, the playback switching control portion, the control information acquisition portion, the alternative video acquisition portion, and the log transmission portion can also be configured as a single unit. Even in the current configuration, the information processing device can switch between the playback of the video stream and the playback of the alternative video, and it can also play back both the video stream and the alternative video. Note that in a case where the alternative video playback portion, the playback switching control portion, the control information acquisition portion, the alternative video acquisition portion, and the log transmission portion of the information processing device according to the embodiments of the present invention are configured as a single unit, it is obvious that the configure elements can be implemented by one or both of hardware and software (an application).

In addition, for the video distribution server 100 according to the embodiments of the present invention, a configuration is shown in which the control information distribution portion 106 distributes the control information, but the embodiments of the present invention are not limited to this configuration. For example, in a case where each of the configuring elements of the information processing device according to the embodiments of the present invention is implemented by software (an application), the control information distribution portion of the video distribution server according to the embodiments of the present invention can also distribute update information for making a correction (for example, removing a bug or the like) in any one of the configuring elements of the information processing device, adding a function, and the like.

Not only can the control information distribution portion of the video distribution server according to the embodiments of the present invention distribute the update information for any one of the configuring elements of the information processing device, it can also distribute, for example, another application that is capable of operating in coordination with any one of the configuring elements of the information processing device.

The configurations described above are merely examples of embodiments of the present invention, and are naturally within the technical scope of the present invention.

What is claimed is:

1. An information processing device comprising:
   a receiving portion that receives:
     a video stream comprising a first video having an associated content data identifier;
     alternative videos separate from the video stream; and
     control information that includes a plurality of switchability flags that indicate whether or not respective videos of the video stream can be switched and a plurality of playback times for respective videos of the video stream; and
   a controller configured to:
     perform playback of the first video of the video stream via a display device;
     perform playback of the alternative videos via the display device;
     during playback of the first video of the video stream via the display device:
       identify a first switchability flag of the plurality of switchability flags based on the content data identifier associated with the first video; and
       determine whether to perform playback of an alternative video as an alternative to the video stream based at least in part on the identified first switchability flag;
     create an alternative video playback list by:
       selecting a first alternative video from the received alternative videos based at least in part on the control information;
       identifying a first playback time of the plurality of playback times based on the content data identifier associated with the first video;

selecting a second alternative video from the received alternative videos based at least in part on the control information; and determining whether the identified first playback time is greater than a combined playback time of the first and second alternative videos; and perform playback of the alternative video playback list via the display device, the alternative video playback list identifying the first alternative video and identifying the second alternative video.

2. The information processing device of claim 1, wherein the video stream comprises a first commercial message video, and wherein the alternative video stream comprises a second commercial message video.

3. The information processing device of claim 1, wherein the alternative video is acquired from a video distribution server based on the control information.

4. The information processing device of claim 1, wherein log information is stored, and wherein the information processing device further comprises a log transmission portion configured to transmit the log information to a video distribution server.

5. The information processing device of claim 4, wherein the log information is generated based on playback of the alternative video.

6. The information processing device of claim 1, further comprising a control information acquisition portion configured to:

determine that receiving of the control information has been completed; and acquire distribution schedule information based on the control information.

7. The information processing device of claim 6, wherein the alternative video is received based on the acquired distribution scheduled schedule information.

8. The information processing device of claim 1, further comprising an alternative video acquisition portion configured to:

acquire a time trigger; and initiate receiving of the alternative video based on the time trigger.

9. The information processing device of claim 1, further comprising a storage portion, wherein the alternative video is received by the receiving portion prior to receiving the video stream, and wherein the storage portion stores the alternative video prior to the receiving portion receiving the video stream.

10. The information processing device of claim 1, wherein the control information includes an upper limit on a number of times that the alternative video can be played back.

11. The information processing device of claim 1, wherein the control information includes a priority for the alternative video.

12. A method comprising:

receiving a video stream comprising a first video having an associated content data identifier, a plurality of alternative videos separate from the video stream, and control information that includes a plurality of switchability flags that indicate whether or not respective videos of the video stream can be switched and a plurality of playback times for respective videos of the video stream;

performing streaming playback of the first video of the video stream that is received, playback being performed via a display device;

during the streaming playback of the first video of the video stream via the display device:

identifying a first switchability flag of the plurality of switchability flags based on the content data identifier associated with the first video; and determining whether to perform playback of an alternative video as an alternative to the video stream based at least in part on the identified first switchability flag;

creating an alternative video playback list by:

selecting a first alternative video from the plurality of received alternative videos based at least in part on the control information;

identifying a first playback time of the plurality of playback times based on the content data identifier associated with the first video;

selecting a second alternative video from the received alternative videos based at least in part on the control information; and determining whether the identified first playback time is greater than a combined playback time of the first and second alternative videos; and performing playback of the alternative video playback list via the display device, the alternative video playback list identifying the first alternative video and identifying the second alternative video.

13. The method of claim 12, wherein the control information includes an upper limit on a number of times that the alternative video can be played back.

14. The method of claim 12, wherein the control information includes a priority for the alternative video.

* * * * *